United States Patent [19]

Baptist

[11] Patent Number: 5,767,629
[45] Date of Patent: Jun. 16, 1998

[54] DEVICE FOR STARTING AND/OR MAINTAINING A DISCHARGE AND COLD CATHODE VACUUM GAUGE INCORPORATING SUCH A DEVICE

[75] Inventor: Robert Baptist, Jarrie, France

[73] Assignee: Commissariat A L'Energie Atomique, Paris, France

[21] Appl. No.: 664,499

[22] Filed: Jun. 17, 1996

[30] Foreign Application Priority Data

Jul. 3, 1995 [FR] France ................ 95 08000

[51] Int. Cl.[6] ........................................... H05B 37/00
[52] U.S. Cl. .................. 315/168; 315/169.1; 315/108; 313/336; 313/309
[58] Field of Search .......................... 315/108, 167, 315/168, 169.1, 193.3, 84.51; 313/309, 308, 336; 324/460; 445/3, 74

[56] References Cited

U.S. PATENT DOCUMENTS

| | | | |
|---|---|---|---|
| 4,035,720 | 7/1977 | Harvey | 315/108 X |
| 5,148,461 | 9/1992 | Shoulders | 378/119 |
| 5,278,510 | 1/1994 | Baptist et al. | 324/460 |
| 5,482,486 | 1/1996 | Vaudaine et al. | 445/3 |
| 5,617,464 | 4/1997 | Mika et al. | 315/169.1 X |
| 5,654,729 | 8/1997 | Garcia | 315/169.1 X |

FOREIGN PATENT DOCUMENTS

| | | |
|---|---|---|
| 0 662 607 | 7/1995 | European Pat. Off. . |
| 41 37 527 | 5/1993 | Germany . |

OTHER PUBLICATIONS

"The Physical Principles of Ultra–High Vacuum Systems and Equipment", Norman W. Robinson, pp. 28–30.

Primary Examiner—Robert Pascal
Assistant Examiner—Haissa Philogene
Attorney, Agent, or Firm—Oblon, Spivak, McClelland, Maier & Neustadt, P.C.

[57] ABSTRACT

A device for starting and maintaining a discharge which is placed within an enclosure. The enclosure contains a discharge zone confined by an electromagnetic field. The device has a microtip electron source located in the vicinity of the discharge zone. The electron source is polarized in such a way that it emits electrons to the discharge zone in order to start and maintain the discharge. The device can be used in a cold cathode vacuum gauge.

10 Claims, 4 Drawing Sheets

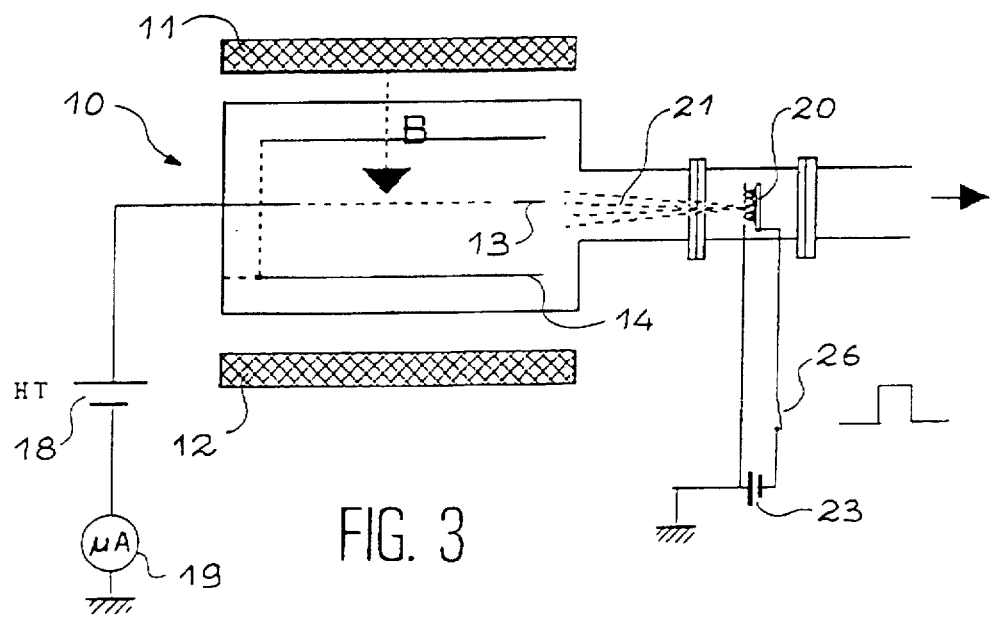
FIG. 3
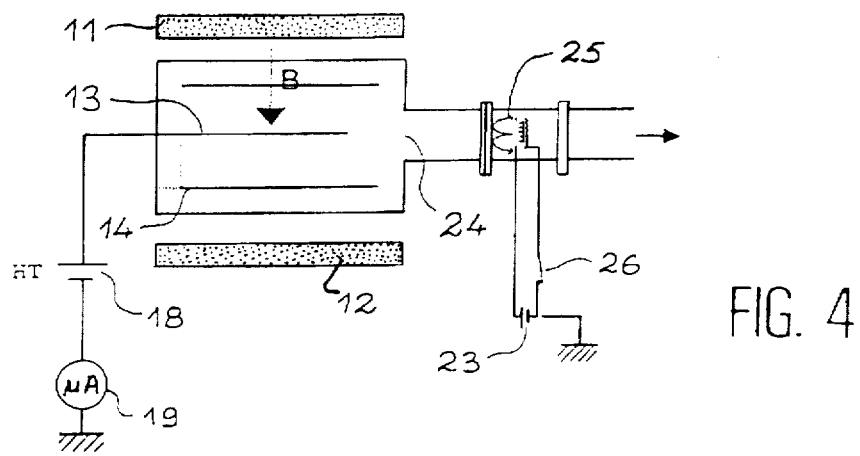
FIG. 4
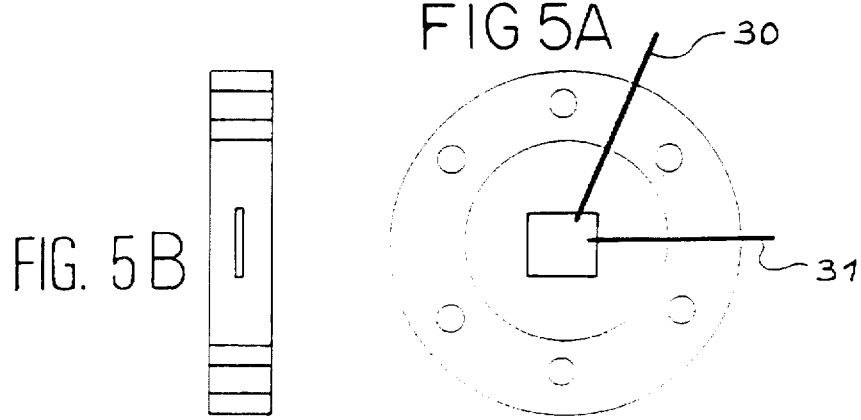
FIG. 5A
FIG. 5B

DEVICE FOR STARTING AND/OR MAINTAINING A DISCHARGE AND COLD CATHODE VACUUM GAUGE INCORPORATING SUCH A DEVICE

BACKGROUND OF THE INVENTION

FIELD OF THE INVENTION

The present invention relates to a device for starting and/or maintaining a discharge and to a cold cathode vacuum gauge incorporating such a device.

DISCUSSION OF THE BACKGROUND

The starting or initiating device according to the invention is a modular element which can be added to any random cold cathode gauge type, naturally provided that the connecting or fastening clips are appropriately chosen, or even to other devices such as discharge tubes in order to ensure their starting or to plasma reactors using discharges.

Vacuum gauges of the cold cathode gauge type cover in general terms Penning gauges, magnetron and inverted magnetron gauges (cf. reference [1]). FIG. 1 shows a Penning gauge 10 having magnets 11, 12, an anode 13 and a cathode 14 in an enclosure 16, as well as a vacuum chamber 15 connected to the enclosure 16. As a function of their type, these gauges make it possible to measures pressures from $10^{-2}$ mbar to $10^{-8}$ mbar or $10^{-10}$ mbar and even below $10^{-10}$ mbar. These gauges are known and widely used in laboratories and in industry, particularly in microelectronics. Their principle is based on the measurement of an electron current on the "anode" electrode or an ion current on the "cathode" electrode, said currents being generated by a self-maintained discharge and are proportional to or a function of the pressure which it is wished to determine. The self-maintenance of this discharge results from the considerable length of the electron paths in the gauge obtained by an appropriate superimposing of electric and magnetic fields therein. However, although these gauges are very robust and have a certain number of advantages compared with hot cathode ionization gauges (e.g. filament-equipped Bayard-Alpert gauges), they suffer from the deficiency of not being systematically restartable at a very low pressure. For example in the case of Penning gauges, if the pressure is lower or approximately $10^{-8}$ mbar, certain gauges do not restart spontaneously on establishing the anode high voltage, although the electron or ion current measured and whose value should be the image of the pressure is extremely low and no longer reflects the real value of the pressure in the vacuum chamber. Therefore the measurement is false and if an automatic control is linked with this measurement, an operating abnormality occurs. At lower pressure of $10^{-9}$ mbar and lower, inverted magnetron gauges suffer from the same defect and a restarting can take several hours. The latter is generally manifested in a random manner and is sometimes generated under the influence of a cosmic ray. The precise reason for the non-starting of certain gauges having apparently the same structure is not known.

In order to obviate this disadvantage, several strategies or devices have been used or are used in order to permit a starting of the gauge:

if the operator is able to approach the vacuum chamber connected to the gauge, a shock or impact on the chamber or gauge using a small weight generally permits restarting due to an instantaneous increase in the degassing leading to a short pressure rise;

certain anodes are covered with thorium oxide, which emits alpha particles favourable for ionization and therefore for the restarting of the discharge (cf. reference [2]);

a photocathode is installed in the vicinity of the anode and receives light at the appropriate time in order to emit by the photoelectric effect an electron current, which will start the discharge;

a filament is installed in the vicinity of the anode and by passing a current into it a local heating occurs, i.e. a desorption, followed by an adequate pressure rise to start the discharge (cf. reference ([3]) and optionally, if the polarization of the filament is correct with respect to the enclosure containing it and the anode, the filament can, by thermoionic emission, emit a few electrons which also initiate the desired discharge;

an ultraviolet discharge lamp is installed in the vicinity of the gauge and the switching on thereof leads to the creation of ultraviolet photons which, by striking the cathode, lead to the emission of electrons by the photoelectric effect and therefore bring about the starting of the discharge (cf. reference [4]);

finally, a tip or point-like electrode can be inserted in the vicinity of the anode in order to supply by the field effect at high voltage an initiating arc (cf. reference [2]).

Certain of these devices have been used in the continuous mode to ensure the maintenance of the discharge in gauges operating on the same principle (namely gauges in which the use of electric and magnetic fields increases the length of the electron paths), but in which the ionization was only semi-autonomous. Such gauges are not at present commercially available.

Therefore the problem is that cold cathode gauges cannot be systematically restarted at very low pressures, said gauges also requiring supplementary means such as a filament, an ultraviolet discharge lamp, etc. in order to bring about such a restarting. All these means respectively have a certain number of disadvantages and in particular an absence of complete reliability.

SUMMARY OF THE INVENTION

In order to obviate the disadvantages of prior art, cold cathode gauges, the device according to the invention constitutes a cold cathode vacuum gauge reliably able to be restarted or maintained, no matter what the vacuum factor, whose value it is wished to determine.

The present invention proposes a device for starting and/or maintaining a discharge, which can be placed in an enclosure within which there is a discharge zone confined by an electromagnetic field. This device is characterized in that it has a microtip electron source located in the vicinity of said zone and means for polarizing said source in such a way that it emits electrons towards the discharge zone in order to start and/or maintain said discharge.

In an advantageous embodiment, the enclosure is that of a cold cathode vacuum gauge in which is located an anode surrounded by a cathode, means for polarizing the cathode, the anode and the enclosure also being provided, together with means for measuring the vacuum by the measurement of the currents flowing through the cathode and/or anode.

The means for polarizing the starting and/or maintaining device have a control means for applying or interrupting the polarization of the grid and the microtips of the source. This control means is generally constituted by a switch which, if it is closed, makes it possible to apply a potential difference between the grid and the microtips and, if it is open, makes it possible to eliminate said potential difference. This control means can also be implemented by an optical coupling, which makes it possible to switch on or off the microtip source polarizing means.

The control means can ensure the polarization of the grid and the microtips of the source prior to the measurement of the vacuum supplied by the gauge in order to start the latter. This type of operation, which only permits the starting of the discharge (the switch being open during the vacuum measurement) is called "pulse operation" of the starting means.

The control means can ensure the polarization of the grid and the microtips during the measurement of the vacuum supplied by the gauge in order to ensure the maintaining of the discharge. This type of operation corresponding to the use of the switch in the closed position during vacuum measurement is called "continuous operation" of the starting and/or maintaining means.

The polarization means of the starting and/or maintaining device apply to the grid of the source a potential equal to or close to that of the enclosure. In general, this is earth potential.

The starting and/or maintaining device according to the invention is directional as a result of the use of a microtip electron source. Therefore it can be placed both in the vicinity and remote from the enclosure discharge zone. This makes it possible to place the starting and/or maintaining device with a very high degree of freedom within the enclosure.

Advantageously the device according to the invention comprises an automatic starting and/or maintaining circuit, which incorporates a comparator, one of whose inputs is connected to a reference voltage, whilst the other input is connected to a voltage output of the measurement means of the gauge, the output of said comparator being connected to the polarization means of the source via a trigger circuit reacting to a given state or to a change of state of the comparator, e.g. on a rising front.

In the case of a pulse type operation the trigger circuit generates a pulse, whereas in the case of a continuous maintenance operation the trigger circuit generates a continuous signal.

Such a starting and/or maintaining device ensures a total reliability for the operation of the gauge and can be used in any industrial installation, where the processes are dependent on measurements supplied by the gauge and in this way e.g. determine the starting up of other equipments (opening of valves, starting up of instruments, etc.). It can be added to most already installed, cold cathode gauges.

Certain gauges, operating on the same principle but having different structures, require the continuous presence of a very weak maintaining current, because the discharge is semi-autonomous and not autonomous. This current, which is below 1 picoampere, can be supplied by the device according to the invention, which is then continuously polarized.

Unlike in the case of all hitherto known applications of microtip cathode electron sources, the cathode no longer functions during the performance of the measurement in the case of pulse operation. This is different from the case of microtip fluorescent screens, which are looked at whilst the microtip cathode is emitting, or hyperfrequency applications in which amplification takes place during the emission of the microtip cathode. In this application, the cathode initiates a reaction and then its function is terminated at the end of roughly 2 seconds. It is then that the result of its action is taken into account.

The gauge according to the invention has numerous advantages compared with the prior art devices.

The advantage of using a microtip cathode compared with an alpha emitter covered anode is the absence of radioactive contamination in the enclosures.

The advantage of using a microtip cathode compared with a filament is on the one hand the robust nature and on the other the absence of degassing (and therefore deterioration of the pressure which is to be measured), because there is no heating. On wishing to extract an electron beam by thermoionic emission from a filament, it is indispensable either to negatively polarize the filament with respect to the enclosures (losing almost all the beam on the enclosure), or to move the filament very close to the anode, because the electrons are emitted with a zero velocity from the filament and are consequently not extracted in the absence of an attracting electric field.

The advantage of using a microtip cathode compared with the discharge lamp is difficult to evaluate. On the basis of the references quoted at the end of the present description, it can be seen that the starting time is not instantaneous as in the case of microtips (3 seconds at $10^{-8}$ mbar or 3 minutes at $10^{-10}$ mbar). In addition, the said system can create parasitic ultraviolet light in the vacuum chamber and which can be very prejudicial in an ESCA (Electron Spectroscope for Chemical Analysis), a vacuum optical spectrometer, etc. and it is not stovable, so that it has to be removed during stoving operations and restored after impact, which requires the intervention of an operator.

The advantage of using a microtip cathode compared with the photocathode is on the one hand that there is no need for the microtip cathode to remain in the dark and on the other its surface is much less sensitive to the residual vacuum and possible pollution than that of a photocathode. Moreover, photocathodes are not generally stovable at high temperatures (stoving at 400° C. for ultra-high vacuum), which is not the case with microtip cathodes.

The advantage of using a microtip cathode compared with macroscopic tips located on or in the vicinity of the anode is that the reliability of the microtip device is 100%, whereas with macrotips (system marketed by Balzers) starting never takes place at very low pressure.

Finally, the fact that the currents extracted from the microtip cathode are very low and very brief allows the assumption to be made of a virtually unlimited life for the operation of the microtip cathode in said application.

The price of the starting device includes that of the clip and the two electric ducts, as shown in FIG. 5, that of the microtip cathode and its fixing system and that of the electric power supply. The latter is very elementary, even when a logic comparison circuit is added thereto. It requires neither a high current, nor a high voltage. Thus, overall low costs result.

BRIEF DESCRIPTION OF THE DRAWINGS

FIG. 3 also shows a gauge according to the invention.

FIG. 4 shows the gauge according to the invention with a poorly polarized cathode.

FIG. 5 illustrates a double face clip provided with contacts for the microtip cathode.

DISCUSSION OF THE PREFERRED EMBODIMENTS

The description provided hereinafter is given within the scope of the application of the device according to the invention to a vacuum gauge, although, as stated hereinbefore, the invention can also apply to other devices using a discharge.

Figure 1:
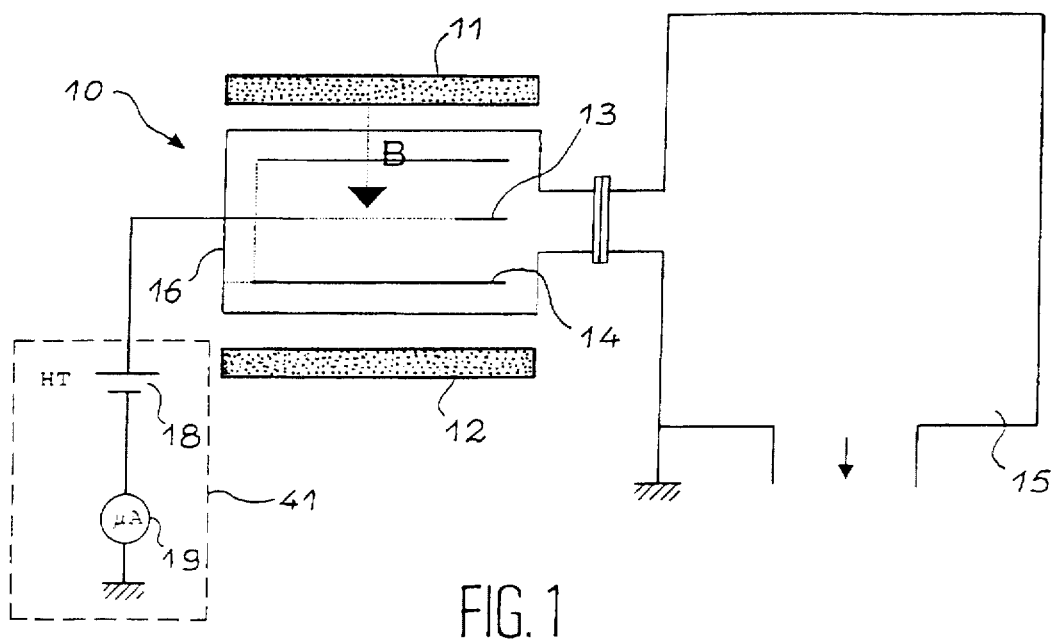
FIG. 1 illustrates a Penning gauge.
Figure 2:
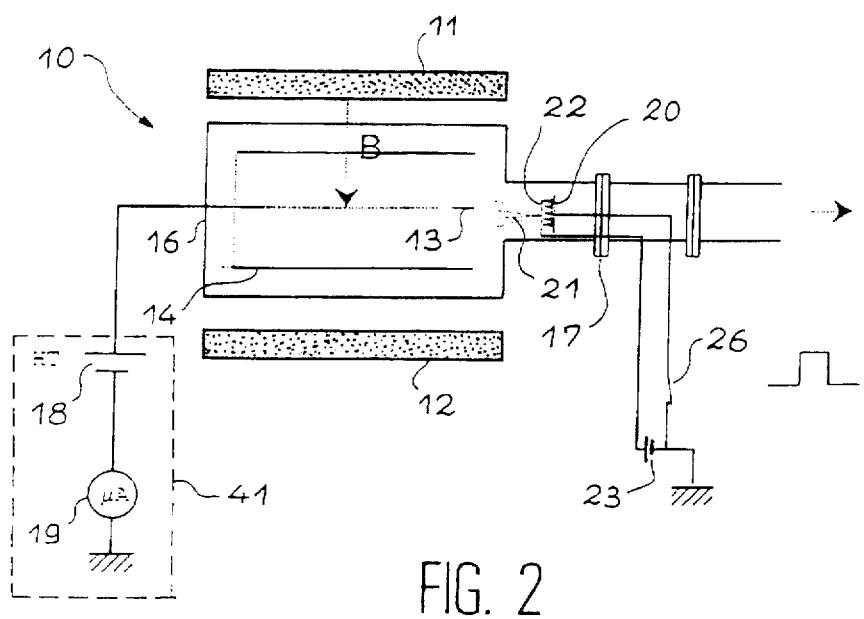
FIG. 2 illustrates a gauge according to the invention.

The cold cathode vacuum gauge according to the invention shown in FIG. 2 is e.g. a Penning gauge having in an enclosure 16 an anode 13 surrounded by a cathode 14, a discharge starting and/or maintaining means, first means for polarizing the cathode (which is generally earthed), the anode (HT) and the enclosure (generally earthed) and magnetic means (magnets 11 and 12) outside the enclosure 16. Said enclosure also has a fastening or connecting means such as a clip 17 connectable to a vacuum chamber, whose vacuum is to be measured. The starting and/or maintaining means has a microtip electron source 20 placed in the vicinity of the fastening means (i.e. upstream or downstream) and second polarizing means 23 able to raise an extraction grid 22 and the microtips of the source to potentials such that there is an electron emission either in pulse or continuous manner to the discharge zone of the enclosure 16.

As shown in FIG. 2, the microtip cathode 20 placed in the vicinity of the discharge zone is able to emit an electron current 21 in the direction of the discharge zone, through the extraction grid 22 and which is sufficient to initiate or maintain a semi-autonomous discharge.

The typical values of an experimental arrangement (whereof some are overdimensioned) are e.g. as follows:

emissive zone of the cathode: 20 mm$^2$ with 400,000 tips, grid-tip polarizing voltage: 30 to 50 V (emitted current below or approximately a few nanoamperes, depending on the emissive quality of the tips), duration of the pulse: 1 to 2 seconds for restarting (or continuous operating conditions at very low voltage of approximately 20 to 30 V for maintenance polarization).

In the arrangement illustrated in FIG. 2, the tips are polarized to earth (potential of the enclosure). In order that the electrons reach the region of the discharge close to the anode, it is necessary for the kinetic energy given to the electrons to be adequate and for said electrons not to have a 0 volt potential "neck" to be cleared on their path, because otherwise they would turn back towards the grid. There can be no neck if the microtip cathode is sufficiently close to the anode, so that the potential decreases from the anode to the cathode extraction grid without passing through values equal to or below 0 volt. If necessary and this is the situation in most cases because the microtip cathode will often be at a certain distance from the anode and there will be a 0 volt neck (produced by the proximity of the vacuum enclosure walls), it is necessary to polarize the cathode by raising the grid to earth, whilst maintaining a potential difference of 30 to 50 V between the grid and tips, as shown in FIG. 3.

Compared with FIG. 2, FIG. 3 corresponds to the use of a microtip electron source remote from the discharge zone, said source being differently polarized in order to take account thereof, i.e. the grid is at a potential equal to or lower than that of the enclosure and in FIG. 3 this is earth. In this case and even if the anode is screened with respect to the cathode by a zero potential, the beam from the tips reaches the discharge zone. With such a starting device, no matter what the pressure, even low pressure in the enclosure, it has proved experimentally possible to restart a Penning gauge or inverted magnetron gauge in the seconds following the putting into operation. Under vacuum conditions, where spontaneous restarting can take several minutes and even about one hour, starting induced by the electron beam from the cathode has been automatic with a 100% reliability in the seconds following the application of the electron pulse. The number of spontaneous startings without the use of the starting device according to the invention were a few units from among several hundred starting operations produced in all.

At present, it would seem that the commercially available gauges operate after being correctly started without being deenergized, even if the pressure is lower than the minimum value of the range which they are intended to measure. However, even if this was not the case, the gauge according to the invention would be able to maintain the discharge in two ways. The first consists of sending an electron pulse at a given frequency (e.g. every hour) and check the measured pressure is that prevailing in the enclosure just prior to the arrival of the pulse. The second consists of continuously sending a low electron current of a few femtoamperes for a gauge measuring a vacuum of $10^{-10}$ mbar polarizing the cathode at around 15 to 30 V. In this case, the maintaining current is well below the electron current generated by the discharge and consequently disturbs neither the latter, nor the measurement. This order of magnitude of the maintaining current must obviously be adjusted as a function of the type of gauge and the emissive properties of the microtip cathode so as not to disturb the measurement.

If no precautions were taken for polarizations e.g. with tips at earth and too far from the gauge, the case of FIG. 4 would be obtained. There is a zero potential region 24 and an electron return to the grid 25.

Moreover, if the vacuum enclosure is not earthed, it is necessary to polarize the cathode as a function thereof.

In the case of a continuous supply of the gauge, for maintaining the discharge, it is sufficient to continuously polarize at approximately 15 to 30 V the cathode grid with respect to the tips in order to generate the useful current (the grid obviously being earthed if the microtip cathode is in the remote position).

A cathode power supply is indispensable for this device. In a minimum version, the operator can, when there is a doubt concerning the satisfactory operation of the gauge (and which indicates a very low pressure either because this is really the case, or because the restarting of the gauge has not taken place), close the switch of the cathode circuit for a brief instant. At this time, the pressure reading "rises" due to the electron current penetrating the anode. When the electron pulse is finished (1 to 2 seconds later), the operator can again read the value of the pressure and either said value is the same as before the pulse, which means that the gauge was started or initiated and the pressure effectively low, or the value has changed, which means that the starting took place in the meantime and the true value to be taken into account is then the latter. In a more elaborate version of the electronics an electronic circuit compares, an instant after the putting into operation, the pressure in the enclosure with a reference value and if the measured pressure is lower, the logic circuit then sends a pulse to the cathode power supply, which generates a low electron current for a brief instant in order to optionally restart the gauge. In the case of maintenance, it is merely necessary to continuously apply polarizations to the two electrodes of the cathode.

Figure 6:
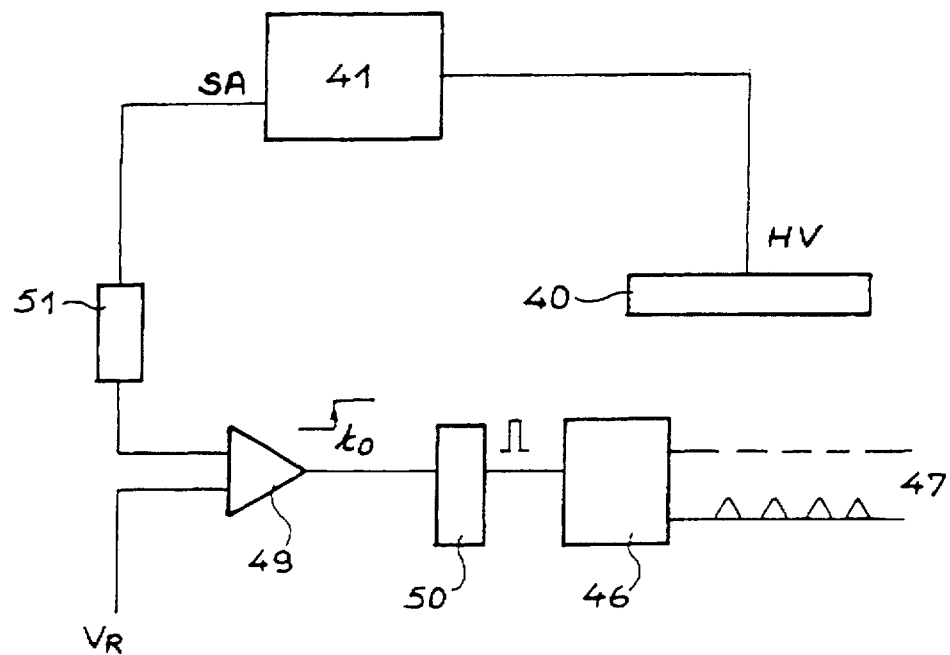
FIG. 6 shows the electric diagram of an automatic circuit for starting.

Thus, as illustrated in FIG. 6, this automatic circuit for starting comprises a comparator 49, one of whose inputs is connected to the controller 41 (which has means 18 for polarizing the gauge and measuring means 19), of a cold cathode gauge 40 through a delay circuit 51, and whose other input has a reference voltage VR (corresponding to a reference pressure P) regulated by the operator, the output of said comparator 49 being connected to the polarization means or to the power supply 46 of the microtip cathode 47 through a trigger circuit 50. The trigger circuit supplies a signal to the power supply means when the comparator output flips between two states or assumes a given state. This signal is either of the pulse type in the case of a pulse operation, or continuous in the case of a maintenance operation.

In exemplified manner, the following operation occurs. On initiating or igniting the controller 41, the analog output SA indicates a voltage in V proportional to or a function of P. If this value exceeds VR, the output of the comparator 49 is at low value. If this is not the case, there is a time to with a transition to the high value. The trigger circuit 50 reacting to the rising front sends a pulse to the power supply 46, which reflects it to the cathode 47.

The idea of reinitiating or restarting a cold cathode gauge by means of an ancillary device is not new and this also applies with respect to the idea of maintaining the discharge by an auxiliary means. The idea of using a microtip cathode in place of a filament in a hot cathode vacuum gauge also already exists.

However, the idea of using a microtip cathode for solving the problem of cold cathode ionization gauges (Penning, magnetron or inverted magnetron) has not been exploited. For the expert the association of these two ideas, namely the replacement of a restarting filament by a microtip cathode in a Penning gauge, is not trivial. Thus, for dimensional reasons, optionally the possibility of replacing said filament, it is not easy to incorporate the latter into the body of the gauge with electric ducts on the actual gauge. Probably the same situation would arise with a microtip cathode. It would therefore appear to be natural to transfer or offset the electric ducts from the starting system to the outside of the gauge, e.g. onto an intermediate clip, as shown in FIGS. 2 and 3. Under these conditions, with an offset filament, it becomes difficult to send electrons to the discharge zone. In this case, it can be assumed that the main reason for the starting is the pressure rise in the enclosure as a result of the heating of the filament and not the presence of an electron cloud in the gauge.

If it was wished to use a filament for initiating the discharge in a Penning gauge or more generally in a cold cathode gauge, various solutions are a priori available to the operator.

Figure 7:
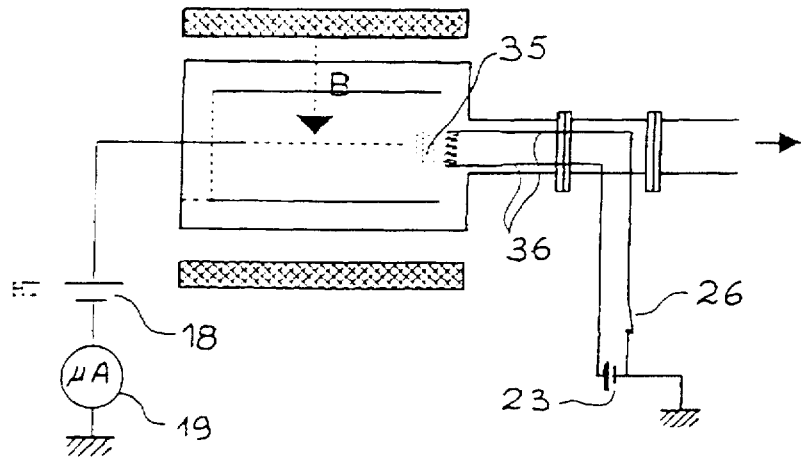
FIGS. 7 and 8 illustrate the difficulty of starting using a filament.

1. The filament is placed as close as possible to the anode (a few millimeter), as shown in FIG. 7. A power supply (a few volts, a few amperes) is placed at the terminals of the filament. One of the terminals of the filament is e.g. connected to earth (i.e. the voltage reference of the installation and in particular the enclosure). When the filament is heated, a thermoionic emission can be generated if the potential applied to the anode is adequate for attracting the electron cloud 35 located around the filament. In this case starting takes place. Moreover, it is highly probable that on heating the filament will slightly desorb, which will locally increase the pressure and may be adequate for starting. Thus, the positioning of the filament in the vicinity of the anode involves either integrating the filament with the gauge, or having rods 36 which are sufficiently long and rigid to adequately approach the high voltage, it is to be expected that the gauge will start no matter what the initial pressure. However, the mechanical arrangement is complicated, namely fragility of the filament, possible degassing source on ignition deteriorating the quality of the vacuum, etc.

Figure 8:
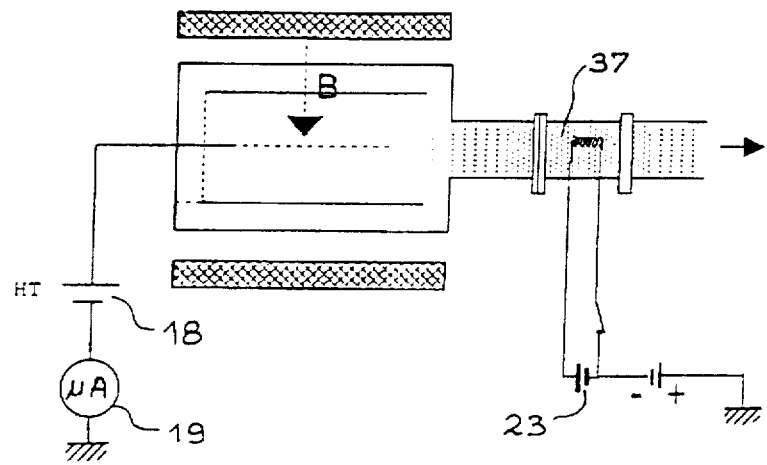

2. The filament is placed outside the gauge, at a few centimeters there from, as shown in FIG. 8. At this instant it becomes difficult to extract the electrons from the filament and direct them towards the anode. Thus, on assuming as in 1. that one of the filament terminals is earthed (like the enclosure), the electric field at the filament is virtually zero, so that no electron is attracted towards the discharge zone. In order to remedy this situation, one of the terminals can be negatively polarized. In this case, most of the electrons 37 emitted will pass to the enclosure walls, which will lead to a pressure rise by desorption under the electron impact, whilst another part will pass to the discharge zone. The ratio of the quantities passing respectively to the enclosure and into the ionization zone will roughly correspond to the ratio of the solid angles under which, from the filament, it is possible to see the enclosure and the discharge zone. If this ratio is small, "high" heating is necessary to have any chance of sending electrons to the anode. However, two power supplies are required, one for heating and another for polarization. Moreover, starting takes place as a result of the electrons, but also due to degassing.

Bearing in mind the above considerations, it is not evident that by placing a not very intense electron source (microtip cathode) and at a non-negligible distance (a few centimeter always remote from the discharge zone) that it would be possible to collect electrons in the discharge zone. To achieve this, a certain number of conditions must be satisfied:

the cathode must pull in the direction of the gauge;

the potential "seen" by the electrons between the extraction grid and the discharge zone must not repel the latter, so that, bearing in mind the value of the kinetic energy of the emitted electrons, which is approximately equal to the difference between the extraction voltage and the voltage applied to the tips (multiplied by the value of the electron charge), it is found that:

if the cathode is remote from the discharge zone (which is not obligatory, but can be advantageous for customers already having a gauge and who wish to acquire a starting device), if the enclosure is earthed (usually the case), if the tips are earthed and the extraction grid positive; then, there are good chances that most of the electrons return to the grid and consequently never reach the discharge zone, as shown in FIG. 4. In this configuration it is obviously possible to choose to generate an intense current in order to create a local pressure rise adequate for starting purposes. However, in general the desire is not to deteriorate the ultra-high vacuum obtained with difficulty.

Thus, according to the invention, the extraction grid is connected to earth, so that the beam from the cathode "advances" to the starting zone. This polarization type is not a priori evident, because the cathode functions here like a diode, because the anode of the gauge, at high voltage, is hidden from the extraction grid by an earth potential curtain.

Therefore the invention consists of appropriately polarizing a microtip cathode, generally placed relatively far from the discharge zone, so that an adequate number of electrons reaches the internal volume of said gauge. The combined choice of a cathode as the directional electron source and an adequate polarization avoids acting on the double table "electron emission plus local degassing production" for starting the gauge. In the present case, a peak current of a few nA for 1 to 2 seconds automatically starts a cold cathode gauge, no matter what the vacuum level to be measured if the latter corresponds to the gauge measuring range.

FIG. 5 gives an example of the fitting of a microtip cathode to an ultrahigh vacuum clip, e.g. a type CF35 double face clip equipped with contacts for the microtip cathode, i.e. the tip contacts 30 and the grid contacts 31. If the enclosure is earthed, it is possible to directly connect the extraction grid to the enclosure, which eliminates an electric duct and reduces by the same amount the price of the clip.

The gauge according to the invention has undergone tests to reveal its advantageous characteristics.

Figure 9:
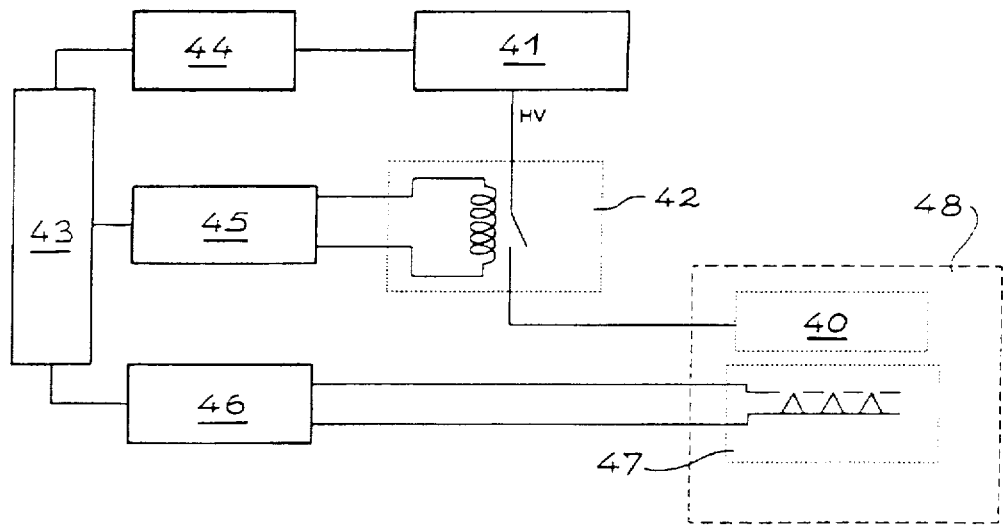
FIG. 9 illustrates an experimental arrangement for testing the starting procedure.

FIG. 2 shows the testing station for the cold cathode gauge equipped with the microtip starting or initiating device. It comprises a vacuum chamber in which it is possible to reach a vacuum of $2 \times 10^{-10}$ mbar. This chamber can be pumped by a turbomolecular pump. The pressure is measured by the cold cathode gauge to be tested. The microtip cathode, i.e. the starting device is inserted between the gauge and the chamber and is positioned 20 mm from the gauge and directs its electron beam on the entrance to the gauge. As the vacuum chamber is at earth potential, the cathode grid is also 0 volt polarized. When a negative pulse is applied to the tips, e.g. –40 V, electrons are emitted by the cathode. They can reach each part located in front of them and in particular the region close to the anode of the gauge, where ionization takes place. As the electron kinetic energy is low (approximately 40 eV), the influence of the magnetic field on the paths of the electrons is high. Therefore two types of gauge have been considered, where the magnetic field configurations are different, so as to establish whether the electron group emitted can reach the discharge zone and produce an ionization necessary for starting the gauge. The first gauge is a Penning double plasma gauge (model CF2P Alcatel-CIT, F 74009 Annecy Cedex). Its measuring range is $10^{-3}$ to $10^{-8}$ mbar. The gauge is assembled with Pneurop KF clips. The second gauge (Balzers) is an inverted magnetron gauge able to function up to $1 \times 10^{-11}$ mbar (triaxial model, Balzers Aktiengesellschaft, FL-9496 Balzers). The gauge has its own small starting device formed from macroscopic needles on the anode. Tests were carried out on its capacity to start alone or with the aid of the microtip cathode at three pressures, namely $10^{-8}$, $10^{-9}$ and $5 \times 10^{-10}$ mbar. The gauge is fitted with a CF35 clip and a triaxial connector. A diagnosis connection diagram is shown in FIG. 9. The cold cathode gauge 40 (Penning or Balzers) is connected to its controller 41 by means of a high voltage sealed contact relay 42. A computer 43 is connected on the one hand to a voltmeter 44 connected to the controller 41 and on the other to a first power supply 45 connected to the relay 42 and finally to a second power supply 46 connected to the microtip cathode 47. The gauge 40 and cathode are located in a vacuum chamber 48. When the relay is closed, the high voltage (normally 2500 to 3500 V) is applied to the gauge anode. The computer 43 can then read the voltage value given by the controller, which is a measure of the pressure indicated by the gauge. If the value does not correspond to the real value expected for the pressure (i.e. the detected electron current is too low), this means that the discharge has still not taken place. The reading given by the controller is "very low or zero pressure". The computer then supplies a pulse voltage V to the cathode across the voltage power supply for 1 or 2 seconds and reads, a short time afterwards, the output voltage of the controller in order to establish whether the discharge has taken place. Otherwise a second pulse of amplitude V+5 volts is supplied to the cathode and so on. When starting has taken place, the controller displays the true value and supplies the voltmeter 44 with a "correct" voltage value, which is then taken into account by the computer 43. For the inverted magnetron gauge, a small modification to the experimental arrangement of FIG. 9 has been made. When the relay supplying the high voltage to the anode is in the open position, it is necessary to earth the anode so as to stop the discharge, which could otherwise take place for a long time and could still be established on closing the relay one hour later.

Table 1, at the end of the description, gives the relative number of successful startings (automatic and assisted) at a pressure of $4 \times 10^{-9}$ mbar for a Penning gauge. It is clear that by using an electron pulse for approximately 1 second, said gauge can be very reliably used.

For the second gauge, the pulse duration was increased to approximately 2 seconds. These test measurements to establish whether the starting of the gauge took place were performed at least 30 seconds after the closing of the relay or after the application of the pulse to the cathode (to take account of the time constants of the controller). Table 2 gives the result obtained.

These results make it clear that the microtip cathode is a perfect device for starting the discharge in a cold cathode gauge. The present microtip cathode has a surface of 20 mm$^2$ and is normally used in other applications with voltages of approximately 50 to 80 V. The then emitted current is approximately 1 µA. In the present application, the emitted current is in the nA or µA range.

Under these conditions, it is clear that if the electron quantity necessary for the starting had to be increased (e.g. in another gauge geometry or for a pressure below $10^{-10}$ mbar), there is an adequate possibility of increasing the extraction voltage. It is also pointed out that in air, a constant voltage of 30 V applied to the cathode, does not subsequently deteriorate its emissive properties in vacuum, which proves that the cathode remains effective in the case of a false manipulation.

All the materials used for the cathode are ultra-high vacuum-compatible and the cathode, at present on a glass substrate, can be stoved at approximately 400° C. Other substrates such as silicon could be used for increasing the stoving temperature. Numerous experiments with cathodes operating in the presence of gases show that for such short operations (1 or seconds at approximately 45 V), the cathode life is several years. Moreover, with such initiation, it would appear that the starting is immediate (a few seconds), the starting time being apparently independent of the pressure level for pressures between $1.10^{-9}$ and $5.10^{-10}$ mbar. Although the starting control takes place one or several minutes after the application of the pulse to the cathode (in order to be sure that the ionization has not ended in the meantime), it was possible to prove that the starting took place only a few seconds after the pulse (5 to 10 seconds). Thus, the situation is different to the case of starting by using a photoelectric effect (3 minutes at $10^{-10}$ mbar)

The pressure increase due to the switching of the microtip cathode is negligible due to the very low value of the extracted current (for comparison in a typical Bayard-Alpert gauge, the current emitted by a filament is about 1 µA).

Thus, due to the use of a microtip cathode located as close as possible, but possibly a few centimeter from a cold cathode gauge, it is possible to completely reliably start the discharge in the sensor necessary for reading the pressure, no matter what the pressure level. As the device only requires a pulse of approximately 30 to 50 V for 1 or 2 seconds without power, said starter can be used either in industry, e.g. microelectronics, where reliability is an important factor, or in large instruments where the pressure measurement control is entirely automatic, as well as in cases where gauges must be switched off for a certain time. The cost of the complete device is essentially determined by that of the clip equipped with one or two electric ducts. With the development of flat, emissive, field effect screens, it is likely that the price of the cathode will become very low in the very near future.

TABLE 1

Relative number of attempts for starting the Penning gauge

| Pressure | Total number of attempts | Direct starting | Assisted starting 35 V | Assisted starting 40 V | Assisted starting 45 V | Assisted starting (total) |
|---|---|---|---|---|---|---|
| $4.10^{-8}$ mbar | 500 | 35 | 131 | 321 | 13 | 465 |

TABLE 2

Relative number of attempts for starting the inverted magnetron gauge

| Pressure | Total number of attempts | Direct starting | Assisted starting 30 V | Assisted starting 35 V | Assisted starting 40 V | Assisted starting 45 V | Assisted starting (total) |
|---|---|---|---|---|---|---|---|
| $10^{-8}$ mbar | 15♣ | 1 | 7 | 7 | 0 | 0 | 14 |
| $10^{-9}$ mbar | 125♦ | 1 | 1 | 69 | 54 | 0 | 124 |
| $10^{-9}$ mbar | 5♥ | 0 | no test | no test | no test | no test | |
| $5.10^{-10}$ mbar | 10♠ | 0 | 10 | | | | 10 |
| $5.10^{-10}$ mbar | 25# | 1 | no test | no test | no test | no test | |

♣:the starting control takes place 60 seconds after energizing the anode or applying the starting pulse
♦:the starting control takes place 30 seconds after the energizing of the anode or the application of the starting pulse
♥:no automatic starting after 35 minutes
♠:the starting control took place 5 minutes after energizing the anode or applying the starting pulse
:only one automatic starting in less than 45 minutes was detected in 25 tests.

REFERENCES

[1] "L'ultra-vide et ses applications" by R. W. Roberts and T. A. Vanderslice (Dunod, Paris 1967, pp 38–40)
[2] "Principles of Vacuum Engineering" by M. Pirani and J. Yarwood (Chapman and Hall, London 1963, pp 123–126)
[3] "The Physical Principles of Ultra-High Vacuum, Systems and Equipment" by N. W. Robinson (Chapman and Hall, London 1968, pp 28–30)
[4] Documentation MKS Instruments Inc: "Ignitorr ™ Cold Cathode Tube Starting Device" (August 1992)

I claim:

1. Device for starting and/or maintaining a discharge and which can be placed in an enclosure, within which is located a discharge zone confined by an electromagnetic field, said device having a microtip electron source which emits electron pulses, located in the vicinity of said zone and means for polarizing the source in such a way that it emits electrons towards the discharge zone in order to start and/or maintain said discharge.

2. Cold cathode vacuum gauge incorporating a device according to claim 1, comprising an anode surrounded by a cathode located in the enclosure, means for polarizing the cathode, the anode and the enclosure, as well as means for measuring the vacuum by measuring current flowing through the cathode and/or anode.

3. Device according to claim 1, wherein the source polarization means incorporate a control means for applying or interrupting the polarization of the grid and the microtips of the source.

4. Device according to claim 3, wherein the control means is constituted by a switch which, if closed, makes it possible to apply a potential difference between the grid and the microtips and, if it is open, makes it possible to eliminate said potential difference.

5. Device according to claim 3, wherein the control means is implemented by an optical coupling means making it possible to switch on or off the polarization means of the microtip source.

6. Device according to claim 3, wherein the control means ensures the polarization of the grid and the microtips of the source prior to the measurement of the vacuum supplied by the gauge in order to start the latter.

7. Device according to claim 3, wherein the control means ensures the polarization of the grid and microtips during the measurement of the vacuum supplied by the gauge in order to ensure the maintenance of the discharge.

8. Device according to claim 1, wherein the source polarization means apply to the source grid a potential equal to or close to that of the enclosure.

9. Device according to claim 8, wherein said potential is earth potential.

10. Device according to claim 1, comprising an automatic circuit for starting and/or maintaining, which incorporates a comparator, one of whose inputs is connected to a reference voltage and the other input is connected to a voltage output of the gauge measurement means, the output of said comparator being connected to the source polarization means via a trigger circuit reacting to a given state or state change of the comparator.

* * * * *